Nov. 26, 1940. P. KESSERY Re. 21,634
PROPELLER
Original Filed May 2, 1939
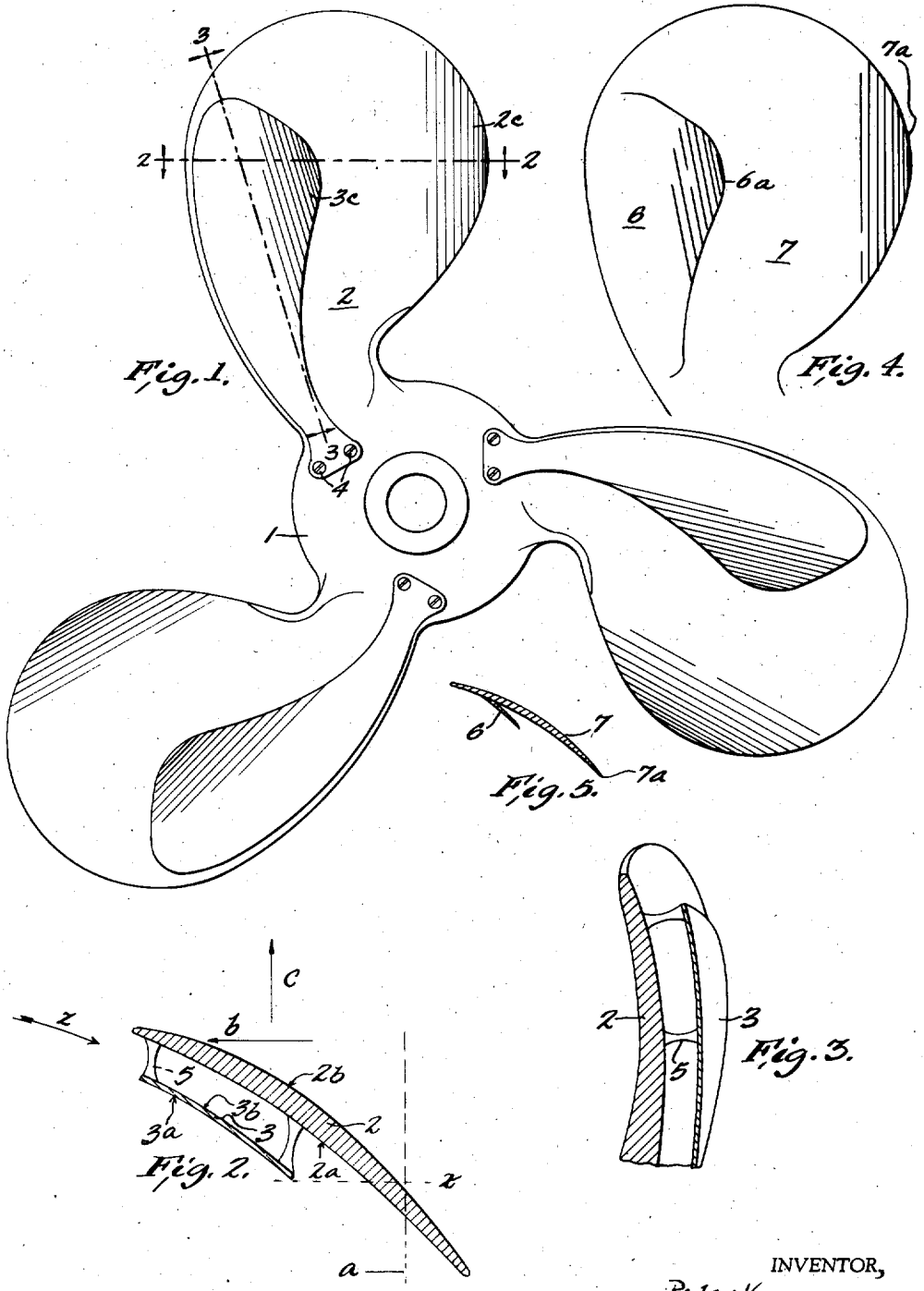
INVENTOR,
Peter Kessery
BY
John W. Stewart.
ATTORNEY.

Reissued Nov. 26, 1940 Re. 21,634

UNITED STATES PATENT OFFICE 21,634

PROPELLER

Peter Kessery, Hawthorne, N. J.

Original No. 2,199,823, dated May 7, 1940, Serial No. 271,270, May 2, 1939. Application for reissue July 1, 1940, Serial No. 343,485

5 Claims. (Cl. 170—165)

This invention consists in certain improvements in screw propellers.

In both forms of the invention herein set forth the propeller includes main blades arranged in a common zone and auxiliary blades also arranged in a common zone abaft the first zone and all said blades have their rear faces pitched on the same hand and to approximately the same degree, the auxiliary blades being substantially wholly eclipsed by that is to say, behind the respective main blades and each such auxiliary blade having its leading and trailing margins projecting in the same general direction as the leading and trailing edges, respectively, of the corresponding main blade. Thus, while the propelling efficiency of the propeller is increased by the presence of the auxiliary blades, such is accomplished without undue turbulence created by them and, since they are eclipsed by the respective main blades, they do not impose a drag or resistance to the propelling effort. Within the scope of what has thus far been indicated the leading margin of each auxiliary blade is not necessarily abaft the corresponding main blade.

But according to one form of my invention each auxiliary blade is spaced, from its leading to its trailing margin, from the corresponding main blade; it approximates in width about one-half that of such main blade and is substantially wholly eclipsed (i. e., viewing the propeller from front to rear, obscured) by such half of the main blade; and its trailing margin is so related to the main blade that a plane perpendicular to the propeller axis and made to coincide with such margin at a point in substantially any circle concentric with said axis will cut the main blade. By this construction I aim to and have produced a propeller which, fully active and effective the same as one identical to mine but devoid of my auxiliary blades, operates without that cavitation which is known to exist in the operation of the ordinary propeller opposite an area of the active or pressure face of each of its blades, especially at high speeds, and which apparently is due to the fluid-parting action of the leading edge portion of each blade, involving beating back the fluid out of the range of said area.

In the accompanying drawing I show the said two forms of the improved propeller specifically as I have devised and used them in practice, but in respect to them as so shown and hereinafter described I wish to be limited only as set forth in the appended claims. In such drawing:

Fig. 1 is a rear or acting face view of a propeller constructed in accordance with this invention;

Figs. 2 and 3 are sections on lines 2—2 and 3—3, Fig. 1, respectively, the parts in Fig. 3 being viewed generally in the direction of arrow *z* in Fig. 2;

Fig. 4 is a view of a fragment of a propeller, showing a modification of the invention; and Fig. 5 is a cross section of the blade shown in Fig. 4.

In Figs. 1 to 3 let 1 be the hub and 2 the blades of a propeller of standard form. The propeller shown is a marine propeller but it might have the form of an aeroplane propeller and be used as such. The rear face 2a of each blade is pitched as shown in Fig. 2. But the pitch of the radially extending segment having as its left-hand margin the leading edge of the blade is less than that of the remaining radially extending segment, said face being concave as shown in said figure. The forward face 2b will usually be convex, as shown. In this example (of a marine propeller) the trailing segment is developed with a trailing lobe portion 2c which defines the trailing edge of the blade.

The auxiliary blade, designated 3, stands spaced from and rearward of the corresponding main blade and it has its rear face 3a substantially parallel with that of such main blade, wherefore this face is characterized the same as the rear face of the main blade, that is, it is pitched the same and has, the same as the main blade, a leading radially extending segment which approaches more to parallelism with any plane perpendicular to the axis of the propeller than the remaining or trailing radially extending segment thereof. The auxiliary blade here has approximately one-half the width of the main blade and is set so that it is squarely rearward, or substantially so, of the leading segment of the main blade and its trailing edge is so formed and related to the main blade that a plane perpendicular to the propeller axis and made to coincide with said trailing edge at a point in any circle concentric with said axis will cut the main blade, here and preferably on about the line *x* well forward of the trailing edge of the main blade. Its front face 3b is here parallel with its face 3a. The contour of the auxiliary blade, viewed axially of the propeller, follows more or less that of the main blade, having its leading margin substantially parallel with that of the main blade and having a lobe 3c defining its trailing edge and which is radially displaced about the same as the lobe 2c of the main blade. The auxiliary blade, however, extends radially outward short of the end of the main blade.

Each auxiliary blade may be affixed to the rest of the structure in any way, as by screws 4 passed through its inner end and tapped into the hub, and posts 5, suitably positioned, and welded to the main and auxiliary blades.

Line *a* in Fig. 2 is the axis of the propeller; arrows *b* and *c* respectively denote the direction of rotation of the propeller and the direction of travel of the boat or other vehicle propelled.

In the modification shown by Fig. 4, a propeller blade is shown which also embodies my invention. Here the blade of a standard propeller has a section 6 of its leading segment cut out and diverted rearwardly. Thus the leading margin of the auxiliary blade—the line at which it begins to be diverted from the main blade—is in approximate coincidence with the leading edge of the main blade.

Having thus fully described my invention what I claim is:

1. The herein described screw propeller including main and auxiliary blades existing pitched bodily on the same hand and to approximately the same degree relatively to the propeller axis and the auxiliary blade having the leading radially extending segment of its rear face pitched less abruptly than the remaining radially extending segment of such face, the auxiliary blade being abaft and having its width approximately one-half that of the main blade and having its leading margin substantially coincident with the leading edge of the main blade.

2. The propeller set forth in claim 1 characterized by the auxiliary blade extending radially short of the main blade.

3. The propeller set forth in claim 1 characterized by the trailing edge of the auxiliary blade being so formed and related to the main blade that a plane perpendicular to the propeller axis and made to coincide with such edge at a point in substantially any circle concentric with said axis will cut the main blade.

4. The propeller set forth in claim 1 characterized by the auxiliary blade extending short of the main blade and by the trailing edge of the auxiliary blade being so formed and related to the main blade that a plane perpendicular to the propeller axis and made to coincide with such edge at a point in substantially any circle concentric with said axis will cut the main blade.

5. A screw propeller including main blades of approximately equal area and similar form and arranged in substantially a common zone and auxiliary blades of approximately equal area and similar form and arranged in substantially a common zone whose forward margin is abaft the forward margin of the first zone and each having approximately one-half the width of the main blades and the auxiliary blades being substantially eclipsed by the respective leading halves of the main blades and all said blades having their rear faces pitched on the same hand and to substantially the same degree, each auxiliary blade having its trailing margin so related to the corresponding main blade that a plane perpendicular to the propeller axis and made to coincide with such margin at a point in substantially any circle concentric with said axis will cut such main blade.

PETER KESSERY.